United States Patent [19]
Nishiba et al.

[11] 3,873,672
[45] Mar. 25, 1975

[54] DESULFURIZATION OF GASES CONTAINING SULFUR COMPOUNDS USING ALKALINE HYPOCHLORITE SOLUTIONS

[75] Inventors: Yoshiharu Nishiba, Yokohama; Kazuhiko Ota, Abiko; Hideya Inaba, Kawasaki, all of Japan

[73] Assignees: Daiki Engineering Co., Ltd., Tokyo; Hitachi Shipbuilding and Engineering Co., Ltd., Osaka, both of, Japan

[22] Filed: Feb. 7, 1973

[21] Appl. No.: 330,282

[30] Foreign Application Priority Data
July 28, 1972   Japan.............................. 47-75728

[52] U.S. Cl................. 423/242, 423/166, 423/193, 423/551, 423/555
[51] Int. Cl........................................... C01b 17/00
[58] Field of Search ........... 423/242, 473, 184, 193, 423/158, 166, 551, 554, 555; 204/95

[56] References Cited
UNITED STATES PATENTS

| | | | |
|---|---|---|---|
| 1,765,869 | 6/1930 | Jaeger et al......................... | 423/242 |
| 2,170,108 | 8/1939 | Barton............................... | 423/473 |
| 2,906,599 | 9/1959 | Roland.............................. | 423/184 |
| 3,331,661 | 7/1967 | Boiston et al...................... | 423/184 |
| 3,390,065 | 6/1968 | Cooper.............................. | 204/95 |
| 3,486,848 | 12/1969 | Hendrix........................... | 423/551 X |
| 3,515,513 | 6/1970 | Parsi................................. | 423/242 |
| 3,607,001 | 9/1971 | Zinfer............................... | 423/242 |
| 3,616,355 | 10/1971 | Themy et al....................... | 204/95 |

*Primary Examiner*—Oscar R. Vertiz
*Assistant Examiner*—Brian E. Hearn

[57] ABSTRACT

Gases containing sulfur compounds, especially sulfur dioxide are contacted with a scrubbing solution comprising alkali hypochlorite, which is formed by the electrolysis of alkali chloride, and hydroxide of alkali or alkali-earth metals.

Sulfur dioxide in the gases is oxidized by alkali hypochlorite in the presence of alkali or alkali-earth hydroxide, and alkali or alkali-earth sulfate and alkali chloride are formed. The scrubbed gases are free of sulfur compounds. The electrolysis of alkali chloride is preferably carried out under a pH between about 8.5 and about 10. The scrubbing solution should have a pH higher than 8.5.

In case that sodium oxide is used as an alkali hydroxide, sodium sulfate is formed and separated from the solution by suitable methods such as deep cooling to crystalize it out as Glauber's salt which is recovered by subsequent filtration.

Remaining solution containing mainly sodium chloride is recycled for further electrolysis to reproduce the sodium hypochlorite for the scrubbing solution.

Calcium hydroxide can be used in a similar manner as a hydroxide, producing calcium sulfate (gypsum) as the end product.

In this case the electrolysis is preferably carried out under a pH between 7.5 to 9.

6 Claims, 1 Drawing Figure

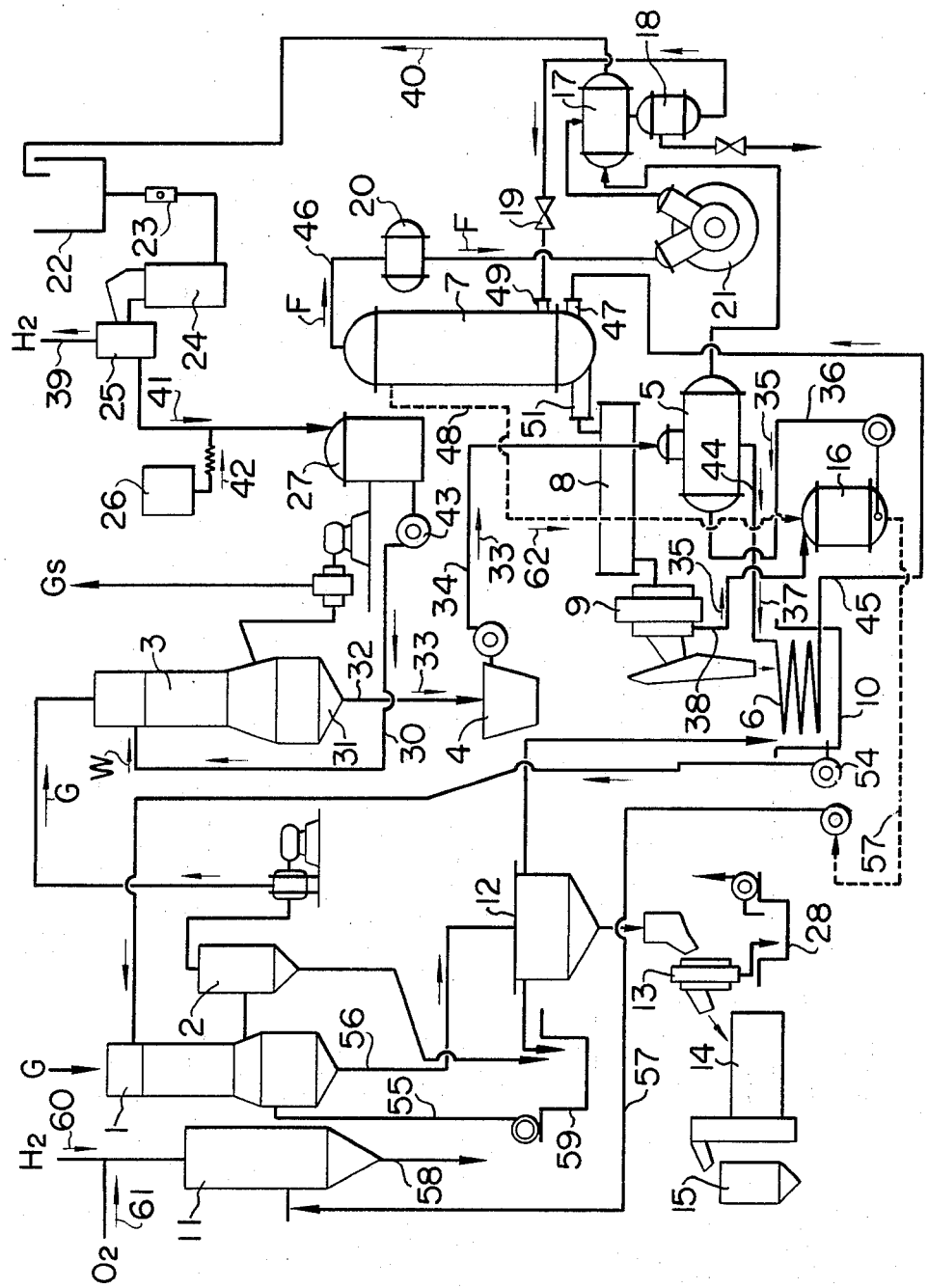

3,873,672

DESULFURIZATION OF GASES CONTAINING SULFUR COMPOUNDS USING ALKALINE HYPOCHLORITE SOLUTIONS

BACKGROUND OF THE INVENTION

The present invention relates to a novel process for the desulfurization of gases containing sulfur compounds, particularly sulfur dioxide under wet oxidation process.

Normally, two methods are followed in desulfurization of gases such as flue gas containing sulfur compounds particularly sulfur dioxide, the dry process and the wet process.

Owing to the better absorption rate of sulfur dioxide compared with that of the dry process, the wet process is more widely practiced at present. Various absorbing agent such as calcium hydroxide, sodium hydroxide, sodium sulfite, ammonium sulfite for sulfur dioxide are employed in the wet process.

However, these methods are not satisfactory due to their incomplete absorption of sulfur dioxide, e.g., the absorption rate of sulfur dioxide by the calcium hydroxide is not more than 92 percent, because of the incompleteness in the absorption of sulfur dioxide as the state of equilibrium exists under given conditions.

Meanwhile, there has been an increasing demand for means to prevent air pollution and a resulting necessity for more effective desulfurization methods with a higher absorption rates of sulfur dioxide.

BRIEF SUMMARY OF THE INVENTION

Accordingly, it is an object of this invention to provide an improved process for desulfurization of gases containing sulfur compounds especially sulfur dioxide to better prevent the air pollution more completely.

Another object of this invention is to provide a process for converting sulfur dioxide in gases into Glauber's salt or its dehydrated salt and obtaining it quantitatively.

A further object of the invention is to provide a process for converting sulfur dioxide in gases into gypsum and obtaining it quantitatively.

A still further object of the invention is to provide an economical process for desulfurization of gases where a portion of the material used for the desulfurization is recycled in the process.

DETAILED DESCRIPTION

The attached single drawing illustrates a flowdiagram of an apparatus suitable for practising an embodiment of the invention employing sodium hydroxide as neutralizing agent.

A preferred example is now described in reference to the drawing:

A gas G containing sulfur dioxide is directed to the first scrubber 1 at a temperature around 200°C and passed to a cyclone 2 at below 60°C and then to the second scrubber 3.

On the other hand, sodium chloride solution is electrolyzed in a cell 24. The electrolysis is performed to such a extent that, for example, by using a solution of sodium chloride of 260 g/l and sodium sulfate 7.3 g/l in a steady state, its electrolyte contains 680 mg/l of sodium hypochlorite.

The electrolyte with hydrogen gas is transferred to the gas-liquid separator 25 and the separated hydrogen gas is blown off from an exhaust pipe 39.

To the remaining solution 41, 16 percent sodium hydroxide solution 42 from a tank 26 thereof is added by a linemixer in an amount to neutralize the sulfuric acid formed in the scrubber by reaction of sodium hypochlorite and sulfurous acid as shown below.

The mixed solution is once stored in a scrubbing solution tank 27 and then fed to the second scrubber 3 by a pump 43 through a pipe 30. The scrubbing solution is contacted with the gas containing sulfur dioxide at 1,500 ppM with a liquid/gas ratio greater than 8 liter/M³.

The scrubbing takes places so as to make the following reactions occur:

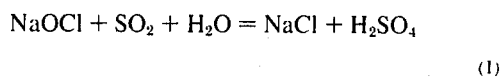

(I)

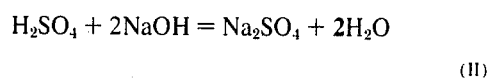

(II)

and to summarize the above:

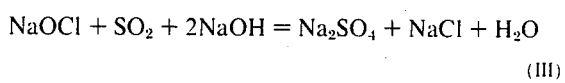

(III)

After the scrubbing, the solution contains 19.54 g/l sodium sulfate (as $Na_2SO_4$) and 225.7 g/l sodium chloride.

Now, in the scrubbed gas Gs leaving the second scrubber 3, no sulfur dioxide is detected by means of detector tube.

The contacted solution 3 flows out through a pipe 32 at the bottom 31 of the second scrubber 3 to a receiver tank 4, and further moves to a heat exchanger 5 for precooling through a pipe 34. This precooling is made for heat economy or reducing power consumption in a freon compressor described below.

Precooled solution 37 is passed through a pipe 44 in a tube coil 6, which is provided in a fusion tank 10, thereby it is further cooled and then fed to a crystallizer 7 through a pipe 45 and a conduit 47. In the crystallizer 7, liquefied freon vaporizes, and the freon vapor and the solution are well mixed by a rotary stirrer provided therein to accomplish direct heat exchange.

When the solution is cooled to a temperature of −3.8°C by the latent heat of freon vaporization, sodium sulfate crystals out as decahydrated salt, i.e. Glauber's salt, and precipitates to the bottom. The crystals are discharged intermittently from a discharge opening 51 as a slurry.

Remaining solution 62 containing mainly of sodium chloride is collected through a pipe 48 in a receiver tank 16. The slurry of the crystals of Glauber's salt is then conveyed by a conveyer 8 having a screw therein to a separator 9 being operated continuously.

A mother liquor 35 from the separator 9 is fed to the receiver tank 16 through a pipe 38 and separated crystals are fed to the fusion tank 10.

As a result of heat exchange in the fusion tank 10, the crystals fuse, or more precisely, turns to a saturated solution of sodium sulfate. (This conversion is endothermic.)

Freon gas F leaving from the crystallizer 7 at a temperature of −3.8°C through pipe 46 is warmed in a heat exchanger 20° to 1°C, and introduced to a refrigerator 21 and a condenser 17 for liquefaction. Freon 12 ($CCl_2F_2$) boils at −29.8°C under atmospheric pressure and is liquefied under the condition of about 6 atoms. and at 30°C. Its solubility in a solution of sodium chloride is about 0.002 percent at 0°C.

The liquefied freon is recycled to the crystallizer 7 through an expansion valve 19 and a conduit 49. Moisture in the liquefied freon, if any, is separated in a storage tank 18 since the specific gravity of freon is greater than that of water (e.g. 1,480 for Freon 12), but a desiccator may be used if necessary.

The sodium chloride containing mother liquor stored in the receiver tank 16 is transferred to the heat exchanger 5 through a pipe 36 and warmed to about 14°C, while the solution 33 is cooled. While being utilized as coolant in the condenser 17, this liquor is warmed to 25°C and pumped up to a head tank 22 through a pipe 40, and sodium hydroxide solution is added to the liquor to adjust pH thereof. The liquor flows through a flow meter 23 for measurement and recycled to the electrolysis cell 24.

Meanwhile, the saturated sodium sulfate solution in the fusion tank 10 is fed to the first scrubber 1 by a pump 54 and cools the inlet gas G so that the gas temperature decreases from 200°C to below 60°C.

Sodium sulfate crystals out as a dehydrated salt in sandy form in the solution, and is discharged from the bottom of the first scrubber 1 through a pipe 56 to a thickener 12 by pressurized water 55. The thickened dehydrated salt is transferred to a separator 13 for dewatering and washing, and dried in a rotary drier 14 and then stored in a silo 15 for delivery.

A major part of the overflow from the thickener 12 is returned to the fusion tank 10, and the rest is added in a tank 59 with drain of the cyclone 2 and recycled to the first scrubber 1 for discharging the dehydrated Glauber's salt (Note: Glauber's salt is sodium sulfate decahydrate).

A mother liquor drained to a tank 28 from the separator 13 may be returned to the tank 59 or the fusion tank 10.

In case that the mother liquor in the receiver tank 16 increases its volume or is diluted during the operation due to condensed water from the scrubber gas, a submerged combustion vessel 11, in which conduits for hydrogen and oxygen (60, 61) are provided, may be employed for concentrating the mother liquor. A portion of the mother liquor is passed through a pipe 57 in the combustion vessel 11 and then directed to the head tank 22 through a pipe 58.

It has been experienced in the practice of the present invention that a certain amount of chlorine gas is extrained by the scrubber gas leaving the scrubber when the pH of the scrubbing solution is lower than 8.5, this results in another cause of pollution. And when the pH is higher than 8.5, little or substantially no chlorine gas is detected in the scrubbed gas.

Further, it has been observed that when the electrolysis is carried out under the pH of 8.5–10, its current efficiency reaches the best level.

So, the pH, under which the electrolysis is performed, is preferably adjusted within a range of about 8.5–10. This pH regulation may be realized conventionally by adding alkaline substances such as hydroxides of alkaline or alkaline earth metal, e.g. hydroxides of sodium, potassium and calcium, preferably sodium hydroxide.

The table below shows the influence of the pH of the feed electrolyte in the above example of the present invention.

Table

| pH | 7.4 | 7.8 | 8.2 | 8.0 | 8.5 | 8.8 | 8.5 | 10.1 | 10.0 |
|---|---|---|---|---|---|---|---|---|---|
| concn. of NaOCl in electrolysed soln. (g/liter) | 0.4 – 1.10 | | | 0.9 | 1.0 | 1.3 | 1.43 | 1.19 | 0.66 |
| inlet gas temp. (°C) | 30 – 35 | | | 63 – 125 | | | 106 | 109 | 83 |
| scrubbing soln. temp. (°C) | 31 – 35 | | | 46 – 66 | | | 60 | 52 | 54 |
| rate of scrubbing (%) | 99.75 | 99.99 | 100 | 99.7 | 99.95 | 100 | 99.95 | 100 | 100 |
| concn. of Cl$_2$ in exhaust gas (ppm) | 15 | 10 | 0 | 7 | 1 | 0 | 0.2 | 0 | 0 |

Although the present invention is exemplified above in connection with the sodium sulfate as end product, it can be applied to produce alkali sulfates of potassium or lithium as well as alkali-earth sulfates such as those of calcium, barium, strontium, employing corresponding hydroxides as the neutralization agents.

When calcium hydroxide is used as a neutralizing agent, oxidation and neutralization reactions are as follows:

$$NaOCl + SO_2 + H_2O = H_2SO_4 + NaCl$$

$$H_2SO_4 + Ca(OH)_2 = CaSO_4 \cdot 2H_2O$$

and to summarize the above:

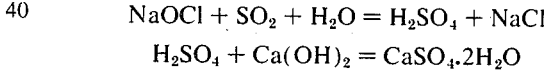
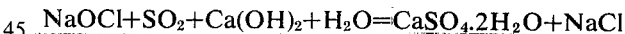

$$NaOCl + SO_2 + Ca(OH)_2 + H_2O = CaSO_4 \cdot 2H_2O + NaCl$$

In this case the pH under which the electrolysis is carried out in this case is preferably adjusted within a range between about 7.5 to 9, since the solubility of calcium hydroxide is significantly small in a solution having such higher pH as pH 10 and the hydroxide deposits on electrodes in the electrolysis cell.

Due to the rather low solubility of calcium hydroxide, the scrubbing solution is slightly turbid. The pH of the scrubbing solution is also preferably adjusted to a pH higher than 8.5 prior to its use by adding calcium hydroxide.

What is claimed is:

1. A process for the desulfurization of gases containing sulfur compounds, which comprises contacting a hot gas containing sulfur compounds with a scrubbing solution having a pH greater than 8.5 and containing sodium hypochlorite and calcium hydroxide in a scrubber, the sodium hypochlorite being produced by the electrolysis of sodium chloride solution, reacting said sulfur compounds with said scrubbing solution in said scrubber to form calcium sulfate and sodium chloride, filtering calcium sulfate as crystals from the effluent solution from said scrubber, and recycling the remaining solution from said filtration for further electrolysis to produce sodium hypochlorite.

2. A process of claim 1, wherein the electrolysis of the solution containing sodium chloride for the production of sodium hypochlorite is carried out under a pH adjusted between about 7.5 to 9.

3. A process of claim 1, wherein at least a portion of the remaining solution is concentrated by evaporation of water before it is recycled to the electrolysis cell.

4. A process for desulfurization of hot gases containing sulfur compounds, which comprises contacting a hot gas containing sulfur compounds with a scrubbing solution having a pH higher than 8.5 and containing sodium hypochlorite and sodium hydroxide in a series of multistage scrubbers, the sodium hypochlorite being produced by the electrolysis of sodium chloride solution, reacting the sulfur compounds with said scrubbing solution in said scrubbers to form sodium sulfate, separating the sodium sulfate thus formed from the effluent solution from the last stage scrubber as crystals of sodium sulfate decahydrate by deep cooling the effluent solution and subsequent filtration, converting the separated crystals of sodium sulfate decahydrate into a saturated solution of sodium sulfate by fusion, recycling the sodium sulfate solution thus formed to the first stage scrubber thereby to form sodium sulfate in a dehydrated form while cooling the hot gas in the scrubber, and recovering said dehydrate sodium sulfate from said first-stage scrubber, and recycling the solution remaining after the sodium sulfate separation for further electrolysis to produce sodium hypochlorite.

5. A process of claim 4, wherein the electrolysis of the solution containing sodium chloride for the production of sodium hypochlorite is carried out under a pH adjusted between about 8.5 to 10.

6. A process of claim 4, wherein at least a portion of the remaining solution is concentrated by evaporation of water before it is recycled to the electrolysis cell.

* * * * *